United States Patent Office 3,537,980
Patented Nov. 3, 1970

3,537,980
REGENERATION AT LOW TEMPERATURES OF PLATINUM-RHENIUM REFORMING CATALYSTS
Harris E. Kluksdahl, San Rafael, Calif., assignor to Chevron Research Company, San Francisco, Calif., a corporation of Delaware
No Drawing. Continuation-in-part of application Ser. No. 729,079, May 14, 1968, which is a continuation-in-part of application Ser. No. 639,719, May 19, 1967, which in turn is a continuation-in-part of application Ser. No. 560,166, June 24, 1966. This application Mar. 12, 1969, Ser. No. 806,707
The portion of the term of the patent subsequent to Dec. 10, 1985, has been disclaimed
Int. Cl. B01j *11/02, 11/04, 11/80*
U.S. Cl. 208—140                                5 Claims

ABSTRACT OF THE DISCLOSURE

A catalyst comprising a rhenium component which has become deactivated due to exposure to a hydrocarbon feed under hydroconversion conditions is restored in activity by contacting the catalyst at a temperature of from 500 to 800° F. with a gas containing oxygen at a partial pressure of at least about 0.1 p.s.i.a. for a period of time of at least 0.1 hour. Preferably, the catalyst contains at least about 0.6 weight percent halide during at least part of the contact with the oxygen-containing gas.

CROSS REFERENCE

This application is a continuation-in-part of application Ser. No. 729,079, filed May 14, 1968, which in turn is a continuation-in-part of application Ser. No. 639,719, filed May 19, 1967, now U.S. Pat. No. 3,415,737, which in turn is a continuation-in-part of application Ser. No. 560,166, filed June 24, 1966, now abandoned.

BACKGROUND OF THE INVENTION

Field

The present invention relates to regeneration of a catalyst comprising a rhenium component. More particularly the present invention relates to the regeneration of a catalyst comprising a platinum group component and a rhenium component in association with a porous inorganic oxide.

Prior art

Rhenium-containing catalysts, particularly rhenium catalysts having a platinum group component in association therewith, have been found to be suitable for various hydrocarbon conversion reactions, such as dehydrogenation, isomerization, dehydrocyclization and reforming. The rhenium-containing catalysts are especially suitable for the reforming of gasoline and naphtha fractions. In particular, in reforming, naphtha fractions are passed in the vapor form over the catalyst comprising a platinum group component and a rhenium component in the presence of hydrogen at a temperature of from 600 to 1100° F. and a pressure of from 25 to 1000 p.s.i.a. Catalysts comprising platinum and rhenium in association with a porous inorganic oxide carrier are very stable in terms of the yield of $C_5+$ gasoline produced during the reforming process.

Rhenium-containing catalysts usually maintain their activity quite well and allow a relatively continuous hydroconversion operation. The catalyst does, however, decline in activity with use, particularly when operating under the severe conditions desired for hydroconversion reactions. Thus, as the activity of the catalyst decreases, the temperature necessary to maintain constant conversion must be increased. The decline in activity of the catalyst is due to the combination of several factors, the most important of which is the accumulation of carbonaceous deposits on the catalyst. The carbonaceous deposits apparently block catalytically active sites, thereby preventing hydrocarbon molecules from gaining access to said sites. After the catalyst decreases in activity to a certain level, that is, after the temperature necessary to maintain constant conversion in the process has reached a certain level, it is usually necessary to replace the catalyst or regenerate it. Generally the high cost of the catalyst prohibits replacing the catalyst; thus, it is most advantageous to restore the initial activity of the catalyst by regeneration.

SUMMARY OF THE INVENTION

It has now been discovered that rhenium-containing catalysts can be regenerated at remarkably low regeneration temperatures. It was heretofore believed that in the regeneration of deactivated catalysts, particularly catalysts containing a platinum group component in addition to rhenium, elevated temperatures were necessary to restore the catalyst to its initial activity; it was believed that a catalyst comprising a platinum group component and a rhenium component in association with a porous inorganic oxide, for example, alumina, would require an elevated temperature as high as 950° F. to remove the carbonaceous deposits from the catalyst and restore the catalyst to its initial activity. Surprisingly, however, a rhenium-containing catalyst, particularly a platinum-rhenium-containing catalyst, can be restored to its initial activity by a mild regeneration, i.e., a regeneration at a temperature of from 500 to 800° F.

It is particularly significant that rhenium-containing catalysts can be regenerated at mild temperature conditions with an oxygen-containing gas. During a hydroconversion process, such as reforming, small amounts of sulfur can enter the reaction system with the feed; substantial amounts of said sulfur compounds will generally become accumulated on the catalyst or on the internals of the hydroconversion equipment, for example, on the walls of the piping, the reactors, etc. Sulfur has been found to be detrimental to rhenium-containing catalysts, particularly platinum-rhenium containing catalysts; the sulfur hurts the yield stability and activity characteristics of the catalyst for reforming. The feedstock to be employed in the reforming operation is a light hydrocarbon oil, for example, a naphtha fraction. Generally the naphtha will boil in the range falling within the limits of from about 70° to 550° F. and preferably from 150° to 450° F. The feedstock can be, for example, either a straight-run naphtha or a thermally cracked or catalytically cracked naththa or blends thereof. The feed should be essentially sulfur free; that is, the feed should preferably contain less than about 10 p.p.m. sulfur and more preferably less than 5 p.p.m. and still more preferably less than 1 p.p.m. Regeneration of the catalyst at elevated temperatures helps remove sulfur compounds from the walls of the pipes and reactors, etc., which sulfur then migrates to the catalyst. The low temperature regeneration of the present process limits the migration of sulfur contaminants to the catalyst.

The process of the present invention involves a method of regenerating a catalyst comprising a rhenium component in association with a porous inorganic oxide, said catalyst having become deactivated during exposure to a hydrocarbon feed under hydroconversion conditions, which comprises contacting the catalyst at a temperature of less than about 800° F., preferably from 500 to 800° F., with a gas containing oxygen at a partial pressure of at least 0.1 p.s.i.a., for a sufficient time to restore the initial activity of said catalyst. Preferably the total pressure of the regeneration gas during regeneration is in the range of 25 to 500 p.s.i.a. and preferably the regeneration gas has an oxygen partial pressure of at least 0.4 p.s.i.a.

As a preferred embodiment of the present process, the catalyst which is regenerated contains at least about 0.6 weight percent halide during at least part of said regeneration; that is to say, it is preferred that at least 0.6 weight percent halide is present on the catalyst before the regeneration or at least during part of the regeneration and that the catalyst after regeneration contains at least 0.6 weight percent halide.

DESCRIPTION OF THE INVENTION

The rhenium-containing catalyst which can be regenerated by the process of the present invention comprises a rhenium component in association with a porous inorganic oxide carrier. Preferably the porous inorganic oxide has a surface area of from 50 to 700 m.$^2$/gm. The carrier can be a natural or a synthetically produced inorganic oxide or combination of inorganic oxides. Thus, the inorganic oxide carrier can be a naturally occurring aluminosilicate or a synthetically produced cracking support such as silica-alumina, silica-zirconia, silica-alumina-zirconia, silica-magnesia, silica-alumina-magnesia, and crystalline zeolitic aluminosilicates. Preferably the porous inorganic oxide carrier contains magnesia and/or alumina. For reforming processes, it is desirable to have a support of low cracking activity, i.e., a carrier of limited acidity.

A particularly preferred catalyst carrier is alumina. Any of the forms of alumina suitable as a support for reforming catalysts can be used. Furthermore, alumina can be prepared by a variety of methods for purposes of this invention. Thus, the alumina can be prepared by adding a suitable alkaline agent such as ammonium hydroxide to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of aluminum hydroxide gel. Also, alumina may be prepared by the reaction of metallic aluminum with hydrochloric acid, acetic acid, etc., in order to form a hydrosol which can be gelled with a suitable precipitating agent, such as ammonium hydroxide, followed by drying and calcination.

The rhenium component can be present in association with the porous inorganic oxide in an amount of from 0.01 to 20 weight percent. Preferably, however, the rhenium component is present in an amount of from 0.01 to 5 weight percent. Regardless of the form in which rhenium is present on the catalyst, whether as metal or compound, the weight percent is calculated as the metal. It is particularly preferred that the rhenium-containing catalyst also have a platinum group component in association therewith. The platinum group component embraces all the members of Group VIII of the Periodic Table having an atomic weight greater than 100 as well as compounds and mixtures of any of these. Thus, the platinum group components are the Group VIII noble metals or compounds thereof. Platinum is particularly preferred because of its better performance in isomerization, reforming, dehydrogenation, etc. The platinum group component should be present in an amount of from 0.01 to 5 weight percent, preferably 0.01 to 3 weight percent and more preferably 0.1 to 2 weight percent, based on the finished catalyst. Whether the platinum group component exists as the metal or compound on the catalyst, the weight percent is calculated as the metal.

The rhenium can be associated with the porous solid carrier by various techniques. Thus, the rhenium can be associated with the carrier by ion-exchange, impregnation, coprecipitation, etc. Generally, it is preferred that the rhenium component be associated with the porous inorganic oxide by impregnation, the impregnation being accomplished with an aqueous solution of a decomposable compound of rhenium in sufficient concentration to provide the desired quantity of the component on the finished catalyst. Preferred rhenium compounds include perrhenic acid, ammonium and potassium perrhenates, etc. When a platinum group component is desired in addition to rhenium, the platinum group component and the rhenium component can be associated with the catalyst either simultaneously or sequentially. The platinum group component is preferably impregnated on the carrier using such platinum group compounds as ammonium chloroplatinates, polyammineplatinum salts, palladium chloride, iridium chloride, chloroiridic acid, etc.

The rhenium-containing catalyst is generally treated with a halide, particularly fluoride or chloride prior to the hydroconversion process. The halide provides a limited amount of acidity which is beneficial for most reactions, for example, isomerization, reforming, etc. Generally the catalyst will contain from 0.1 to 3 weight percent total halide. The halide can be incorporated onto the catalyst at any suitable stage of catalyst manufacture, e.g., prior to or following incorporation of the rhenium component. Some halide is often incorporated onto the carrier by impregnating with the rhenium component; that is, impregnation with a rhenium compound, which also contains chloride, results in chloride addition to the catalyst. Additional halide may be incorporated onto the carrier, e.g., by contacting the porous inorganic oxide with hydrogen fluoride, ammonium fluoride, hydrogen chloride, ammonium chloride, etc.

A rhenium-containing catalyst, e.g., a platinum-rhenium catalyst, which has been subjected to a hydroconversion process, e.g., reforming, for an extended period of time becomes deactivated through the accumulation of carbonaceous deposits thereon. It is possible for the rhenium-containing catalyst to have as high as 15 to 20 weight percent or more carbon accumulated thereon before regeneration. However, after the catalyst has been deactivated, the regeneration process of the present invention involves heating the catalyst at a temperature from 500 to 800° F. and a pressure of from 25 to 500 p.s.i.a. with a gas containing oxygen at a partial pressure of at least about 0.1 p.s.i.a. for a sufficient time, preferably, 0.1 hour and more preferably, 0.5 hour, to substantially restore the initial activity of said catalyst. Surprisingly such mild regeneration restores the catalyst to its initial activity.

The preferred embodiment of the regeneration procedure of the present invention will be explained in respect to a catalyst comprising a platinum component and a rhenium component in association with alumina. It is understood, however, that the regeneration procedure is applicable to rhenium-supported catalyst in general.

Following discontinuation of a reforming process with a platinum-rhenium catalyst, the catalyst having become deactivated during prolonged contact with a naphtha feed at reforming conditions, the catalyst bed is generally swept with a nitrogen containing gas to purge the catalyst of any hydrocarbon materials present. Other inert gases could also be used. The nitrogen purge is accomplished at a low pressure to help withdraw hydrocarbons from the reactor. Furthermore, the purge at low pressure reduces the quantity of nitrogen required. After the nitrogen purge, the reactor is pressured with nitrogen to the pressure at which the regeneration gas is available, i.e., a pressure of from 25 to 500 p.s.i.a. The nitrogen is circulated over the catalyst by means of a recycle system; the catalyst is heated to a temperature of greater than 500° F. but less than 800° F. With the catalyst at the temperature desired for the regeneration, an inert gas containing oxygen, e.g., air, is introduced into the reactor system. An inert gas for use in the present process is a gas which has little or no effect on the regeneration, that is, does not react with the oxygen or with the catalyst. Suitable inert gases are nitrogen, argon, etc. At no time should the partial pressure of oxygen exceed about 10 p.s.i.a.; preferably the partial pressure of oxygen should be from 0.1 to 7.5 p.s.i.a. Contact with the oxygen containing gas at an elevated temperature, i.e., from 500 to 800° F., continues until the carbonaceous deposits are burned from the catalyst, preferably to a level of less than about 0.1 weight percent, to restore the activity of the catalyst to that of fresh catalyst. Care must be exercised to prevent temperature from exceeding 800° F. even during the combustion step. Following the contact with the oxygen-containing gas, the system is again purged with a nitrogen-containing gas to remove any oxygen from the system. Thereafter, the catalyst is preferably contacted with the hydrogen-containing gas at a temperature above 500° F., preferably 500° F. to 800° F., for a period of time of at least 0.5 hour. The catalyst thus treated is then ready for use in a reforming process.

It is particularly preferred that the catalyst contain at least 0.6 weight percent halide and preferably 0.75 weight percent halide during at least part of the regeneration step. It is particularly preferred that the catalyst contain 0.6 weight percent halide when initially contacted with the regeneration gas. Thus, it may be desirable to add halide during the final stages of reforming to bring the catalyst halide content up to at least 0.6 weight percent. If halide is not on the catalyst at the end of the reforming step, halide can be added during the regeneration. It is considered highly desirable that at least 0.75 weight percent halide be present on the catalyst during at least part of the regeneration. At the low temperature used during regeneration, halide will not be stripped from the catalyst. Thus, substantially all of the halide added will become associated with the catalyst and remain in association with the catalyst during the regeneration. Thus, the regenerated catalyst will contain at least about 0.6 weight percent halide. Suitable halides to add to the catalyst during regeneration include fluorine, chlorine, hydrogen chloride, hydrogen fluoride, propylene dichloride, etc.

The present invention may be more fully understood by reference to the following examples.

EXAMPLE 1

A catalyst comprising 0.6 weight percent platinum, 0.6 weight percent rhenium, and 0.6 weight percent chloride in association with an alumina support, the catalyst having been prepared by impregnating the alumina with chloroplatinic acid and perrhenic acid to provide the desired level of platinum and rhenium concentration on the catalyst, was used for reforming at reforming conditions including a temperature of from 910 to 940° F. and a pressure of about 500 p.s.i.g. to produce a 90 F-1 clear octane product. After the catalyst had become sufficiently deactivated, that is, after about 19 weight percent carbon was present on the catalyst, the catalyst was subjected to a regeneration procedure in accordance with the present invention.

The catalyst was contacted with an oxygen-nitrogen gas at a temperature of 750° F. for about 48 hours. The partial pressure of oxygen in the regeneration gas was about 1.0 p.s.i.a. The contact of the oxygen-containing gas was continued until substantially all the carbon was removed from the catalyst and the activity of the catalyst was restored to its initial state. Chloride was added during the regeneration step. The chloride was added to obtain a final chloride level on the catalyst of about 1.05. $H_2O$ was also present in the regeneration gas in an amount of about 0.5 p.s.i.a.

The catalyst having been regenerated was then subjected to an accelerated reforming test. The conditions of reforming included a pressure of 125 p.s.i.g., a temperature of from 930 to 1000° F., and a liquid hourly space velocity of 3.0 to produce a product having an F-1 clear octane number of 102. The feed used was a California heavy naphtha. The fouling rate of the catalyst, that is, the temperature increase necessary to maintain constant conversion of the feed to 102 F-1 clear octane product, was found to be about 3.3° F./hr. which is approximately the fouling rate as that for a fresh catalyst (~3.0° F./hr.) comprising 0.6 weight percent of platinum and 0.6 weight percent rhenium.

EXAMPLE 2

A catalyst containing 0.6 weight percent platinum, 0.6 weight percent rhenium, and 0.6 weight percent chloride in association with an alumina support was used for reforming a naphtha feed boiling within the range of from 230 to 400° F. The reaction conditions included a pressure of 500 p.s.i.g. and a hydrogen to hydrocarbon mole ratio of about 5.0. The reforming process was continued until the catalyst in the third reactor of a three-reactor system contained about 19.0 weight percent carbon. Chloride was added during the reforming process; approximately 0.8 weight percent chloride was on the catalyst just prior to regeneration.

The catalyst was regenerated in the presence of a nitrogen atmosphere with a limited supply of oxygen present. The catalyst was contained in three reactors; the period of contact with the regeneration gas included a time of 10 hours for catalyst in the first reactor, 16 hours for catalyst in the second reactor, and 44 hours for catalyst in the third reactor. More time was needed in the third reactor because of the greater carbon content on the catalyst in that reactor. The temperature of the catalyst during regeneration was never greater than about 800° F. No chloride was added during regeneration. The oxygen partial pressure at each reactor inlet varied from about 0.5 to 4 p.s.i.a.

The chloride contents on the regenerated catalysts were about 0.51, 0.66 and 0.76 for the catalysts from the first, second and third reactors, respectively.

The regenerated catalysts were tested in an accelerated reforming test at conditions including a pressure of 125 p.s.i.g., a liquid hourly space rate of 3 and a hydrogen to hydrocaron mole ratio of 3.0 to produce 102 F-1 clear octane gasoline. Fouling rates, that is, the increase in temperature necessary to maintain constant conversion of the feed to 102 F-1 clear octane gasoline, was measured for the regenerated catalysts from the three reactors.

The fouling rates were 6.8° F./hr., 4.1° F./hr. and 3.3° F./hr. for catalysts from the first, second and third reactors, respectively. The fouling rate of fresh catalyst containing about 0.6 weight percent platinum, 0.6 weight percent rhenium and 0.6 weight percent chloride on alumina is about 3.0° F./hr. Thus, regeneration by the process of the present invention was successful. The catalysts with high chloride, i.e., greater than 0.6 weight percent, were restored to substantially the initial activity, as determined by the fouling rate.

The foregoing disclosure of this invention is not to be considered as limiting since many variations can be made by those skilled in the art without departing from the scope or spirit of the appended claims.

I claim:

1. A method of reforming a naphtha feed containing less than about 10 p.p.m. sulfur which comprises:
   contacting the naphtha feed with hydrogen at reforming conditions with a catalyst comprising 0.01 to 3 weight percent platinum and 0.01 to 5 weight percent rhenium associated with an alumina-containing support until the activity of the catalyst is substantially impaired and carbonaceous deposits accumulated thereon;
   discontinuing contact of the catalyst with the naphtha-hydrogen mixture;
   subjecting the catalyst to contact at a temperature of from 500 to 800° F. with a regeneration gas at a pressure of from 25–500 p.s.i.a., the regeneration gas containing oxygen at a partial pressure of at least 0.1 p.s.i.a., the catalyst containing at least about 0.6 weight percent halide during at least part of the contact with the regeneration gas, to effect combustion of the carbonaceous matter whereby the carbon content of the catalyst is substantially reduced;

subjecting the catalyst to contact with a hydrogen containing gas at a temperature of at least 500° F.; and then contacting the catalyst with the naphtha-hydrogen mixture under reforming conditions.

2. The process of claim 1 wherein said oxygen partial pressure is at least 0.4 p.s.i.a.

3. The process of claim 1 wherein said catalyst contains at least about 0.75 weight percent halide during at least part of the contact with said regeneration gas.

4. The process of claim 3 wherein said halide is chloride.

5. The method of reforming a naphtha feed containing less than about 10 p.p.m. sulfur which comprises:

contacting said naphtha with hydrogen in the presence of a catalyst comprising 0.01 to 3 weight percent platinum and 0.01 to 5 weight percent rhenium with an alumina-containing support at reforming conditions including a temperature of from 600 to 1100° F. and a pressure of from 25 to 1000 p.s.i.g., until the activity of said catalyst is substantially impaired and carbonaceous deposits accumulated thereon;

discontinuing contact of the catalyst with the naphtha-hydrogen mixture;

purging the catalyst and subjecting it to treatment at a temperature of from 500 to 800° F. with a stream of inert gas containing oxygen at a partial pressure of at least 0.1 p.s.i.a., said catalyst containing at least about 0.6 weight percent halide during at least part of the treatment with said inert gas containing oxygen to effect combustion of said carbonaceous matter whereby the carbon content of the catalyst is reduced to less than about 0.1 weight percent;

subjecting the carbon-depleted catalyst to contact with a hydrogen containing gas at a temperature of from 500 to 800° F.; and then contacting the catalyst with said naphtha-hydrogen mixture under the conditions previously employed for the reforming operation.

References Cited

UNITED STATES PATENTS

| | | | |
|---|---|---|---|
| 2,641,582 | 6/1953 | Haensel | 252—416 XR |
| 2,882,241 | 4/1959 | Slynstad et al. | 252—419 |
| 3,011,967 | 12/1961 | Schmitkons et al. | 208—140 XR |
| 3,296,118 | 1/1967 | Czajkowski et al. | 208—138 XR |
| 3,415,737 | 12/1968 | Kluksdahl | 208—139 |
| 3,434,960 | 3/1969 | Jacobson et al. | 208—138 |
| 3,030,301 | 4/1962 | White et al. | 208—140 |
| 3,407,135 | 10/1968 | Brown | 208—139 |

OTHER REFERENCES

Blom et al.: "Ind. & Eng. Chem.," vol. 54, No. 4, April 1962, pp. 16–22.

Blom et al.: "Hydrocarbon Processing & Petroleum Refiner," vol. 42, No. 10, October 1963, pp. 132–134.

DANIEL E. WYMAN, Primary Examiner

P. E. KONOPKA, Assistant Examiner

U.S. Cl. X.R.

208—139; 252—415, 416, 419

PO-1050
(5/69)

UNITED STATES PATENT OFFICE
CERTIFICATE OF CORRECTION

Patent No. 3,537,980              Dated November 3, 1970

Inventor(s)  HARRIS E. KLUKSDAHL

It is certified that error appears in the above-identified patent and that said Letters Patent are hereby corrected as shown below:

Col. 7, line 18, after "rhenium" and before "with" insert --associated--.

SIGNED AND
SEALED
MAR 16 1971

MAR. 16, 1971

(SEAL)
Attest:

Edward M. Fletcher, Jr.
Attesting Officer

WILLIAM E. SCHUYLER, JR.
Commissioner of Patents